US012730733B2

(12) United States Patent
Gao et al.

(10) Patent No.: US 12,730,733 B2
(45) Date of Patent: Sep. 8, 2026

(54) METHOD AND APPARATUS FOR PERFORMING PERIODIC TASK

(71) Applicant: Telefonaktiebolaget LM Ericsson (publ), Stockholm (SE)

(72) Inventors: Tonghai Gao, Beijing (CN); Qirong Tang, Beijing (CN); Zhanhong Xia, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/835,755

(22) PCT Filed: Feb. 18, 2022

(86) PCT No.: PCT/CN2022/076921
§ 371 (c)(1),
(2) Date: Aug. 5, 2024

(87) PCT Pub. No.: WO2023/155165
PCT Pub. Date: Aug. 24, 2023

(65) Prior Publication Data

US 2025/0156290 A1 May 15, 2025

(51) Int. Cl.
*G06F 11/30* (2006.01)
*G06F 9/48* (2006.01)

(52) U.S. Cl.
CPC .......... *G06F 11/3037* (2013.01); *G06F 9/485* (2013.01); *G06F 2201/88* (2013.01)

(58) Field of Classification Search
CPC .. G06F 11/3037; G06F 9/485; G06F 2201/88; H04Q 11/04
See application file for complete search history.

(56) References Cited

U.S. PATENT DOCUMENTS 7,639,693 B1 * 12/2009 Lewis ..................... H04L 47/50 370/449
9,015,718 B1 * 4/2015 Zhang .................. G06F 9/4881 718/100
2018/0032400 A1 * 2/2018 Lesartre .................. G11C 7/08

FOREIGN PATENT DOCUMENTS

CN 1388928 A 1/2003
CN 110837409 A 2/2020

(Continued)

OTHER PUBLICATIONS

International Search Report and Written Opinion for International Patent Application No. PCT/CN2022/076921, mailed Nov. 11, 2022, 10 pages.

(Continued)

*Primary Examiner* — Masud K Khan
(74) *Attorney, Agent, or Firm* — Withrow & Terranova, PLLC

(57) ABSTRACT

The present disclosure relates to a method and an apparatus for performing periodic task. A method for performing a periodic task may comprise: determining a time unit, based on a time period needed for scanning a first random access memory, RAM; scanning circularly the first RAM; and performing a task with a predetermined periodicity, based at least on a cycle number for scanning the first RAM. The cycle number is determined, based on the time unit and the predetermined periodicity. According to embodiments of the present disclosure, an improvement for performing a periodic task may be provided. Particularly, embodiments of the present disclosure may be applied not only in slow and small-scale periodicities, but also applicable even when the periodicities have values varying in a large range, and/or when some periodicities have very small values.

18 Claims, 6 Drawing Sheets

(56) References Cited

FOREIGN PATENT DOCUMENTS

| | | | |
|---|---|---|---|
| CN | 110956995 | A | 4/2020 |
| CN | 113115138 | A | 7/2021 |
| JP | 2003036241 | A | 2/2003 |
| JP | 4250566 | B2 | 4/2009 |

OTHER PUBLICATIONS

Extended European Search Report for European Patent Application No. 22926492.4, mailed Nov. 3, 2025, 85 pages.

* cited by examiner

METHOD AND APPARATUS FOR PERFORMING PERIODIC TASK

This application is a 35 U.S.C. § 371 national phase filing of International Application No. PCT/CN2022/076921, filed Feb. 18, 2022, the disclosure of which is incorporated herein by reference in its entirety.

TECHNICAL FIELD

The present disclosure relates generally to the electric technology, and in particular, to a method and an apparatus for performing a periodic task.

BACKGROUND

This section introduces aspects that may facilitate a better understanding of the disclosure. Accordingly, the statements of this section are to be read in this light and are not to be understood as admissions about what is in the prior art or what is not in the prior art.

In an electric system, such as in ethernet system or a telecommunication system or etc., usually a lot of tasks need to be performed periodically. For example, some ethernet OAM (Operation, Administration and Maintenance) features, such as BFD (Bidirectional Forwarding Detection), PTP (Precision Time Protocol), VRRP (Virtual Router Redundancy Protocol), TWAMP (Two-Way Active Measurement Protocol), throughput, etc., need to send messages periodically. Correspondingly, some equipment may need to receive the messages and do timeout detection, which are also a periodic tasks.

SUMMARY

In such system, different periodical tasks may need very different periodicities. For example, some tasks may be performed repeatedly with a periodicity of several milliseconds, while other task may be performed with a periodicity of several seconds. The periodicity may indicate the specific interval between two repeated actions. Such different periodicities may have values varying in a large range, and/or some periodicities may have very small values.

Further, some protocols need to support large specifications, such as several thousand sessions, each for one or more messages. This means that many sessions need to send messages in parallel, and their periods are different. These periods may be irregular, such as not integer milliseconds.

Certain aspects of the present disclosure and their embodiments may provide solutions to these or other challenges. There are, proposed herein, various embodiments which address one or more of the issues disclosed herein.

Embodiments of the present disclosure may provide improvement for performing a periodic task. Particularly, embodiments of the present disclosure may be applied even when the periodicities have values varying in a large range, and/or when some periodicities have very small values.

A first aspect of the present disclosure provides a method for performing a periodic task. The method may comprise: determining a time unit, based on a time period needed for scanning a first random access memory (RAM); scanning circularly the first RAM; and performing a task with a predetermined periodicity, based at least on a cycle number for scanning the first RAM. The cycle number is determined, based on the time unit and the predetermined periodicity.

In embodiments of the present disclosure, the time period is needed for scanning a first RAM one time.

In embodiments of the present disclosure, the cycle number equals to the predetermined periodicity divided by the time unit.

In embodiments of the present disclosure, the cycle number is stored in a second RAM.

In embodiments of the present disclosure, scanning the first RAM may comprise: reading a value stored in a memory unit in the first RAM; comparing the value to the cycle number; incrementing the value, and writing the incremented value to the memory unit, if the value is less than the cycle number.

In embodiments of the present disclosure, the task is performed, if the value is greater than or equal to the cycle number.

In embodiments of the present disclosure, the first RAM comprises a plurality of memory units, with each memory unit being used for one task.

In embodiments of the present disclosure, the plurality of memory units are scanned sequentially or in parallel, during each cycle for scanning the first RAM.

In embodiments of the present disclosure, scanning the first RAM may comprise: sequentially reading m values stored respectively in m memory units in the plurality of memory units; wherein m is an integer; sequentially writing m incremented or reset values respectively to the m memory units. Following actions are performed in parallel with the sequentially reading action and/or the sequentially writing actions: for an ith value stored in an ith memory unit, wherein i is an integer equal to or greater than 1, and equal to or less than m, comparing the ith value to a corresponding ith cycle number; incrementing the ith value, if the ith value is less than the ith cycle number; or resetting the ith value, if the ith value is equal to or greater than the ith cycle number.

In embodiments of the present disclosure, an ith task corresponding to the ith memory unit is performed, if the ith value is equal to or greater than the ith cycle number.

In embodiments of the present disclosure, a comparing step, an incrementing step, and/or a resetting step for the ith value are performed in parallel with a reading step, a comparing step, an incrementing step, a resetting step and/or a writing step for a jth value; wherein j is an integer equal to or greater than 1, equal to or less than m, and different from i.

In embodiments of the present disclosure, m+1 is a number of clock cycles needed to sequentially perform a reading step, a comparing step, an incrementing step or a resetting step, and a writing step for one value stored in one memory unit.

In embodiments of the present disclosure, the first RAM comprises a plurality of groups, each group including m memory units. The plurality of groups are scanned sequentially.

In embodiments of the present disclosure, the time unit equals to 2*k*clock cycle period, when k is greater than or equal to 2*m; wherein k is a total number of memory units in the first RAM.

In embodiments of the present disclosure, the first RAM is associated with a field programmable gate array, FPGA, or an application specific integrated circuit, ASIC.

In embodiments of the present disclosure, the task comprises transmitting data packets periodically; or the task comprises transmitting a report periodically: or the task comprises detecting a timeout of a report periodically.

In embodiments of the present disclosure, the third clock distribution apparatus may be further operative to implement the method according to any of embodiments described above.

A second aspect of the present disclosure provides an apparatus for performing a periodic task. The apparatus may comprise: a processor; and a memory. The processor is configured for: determining a time unit, based on a time period needed for scanning a first random access memory, RAM; scanning circularly the first RAM; and performing a task with a predetermined periodicity, based at least on a cycle number for scanning the first RAM. The cycle number is determined, based on the time unit and the predetermined periodicity.

In embodiments of the present disclosure, the apparatus may be further operative to implement the method above mentioned.

A third aspect of the present disclosure provides a computer readable storage medium having a computer program stored thereon. The computer program may be executable by an apparatus to cause the apparatus to carry out the method according to any of embodiments described above.

According to embodiments of the present disclosure, an improvement for performing a periodic task may be provided. Particularly, embodiments of the present disclosure may be applied not only in slow and small-scale periodicities, but also applicable even when the periodicities have values varying in a large range, and/or when some periodicities have very small values.

Some embodiments of the present disclosure are particularly suitable for situations as follows, a situation when the specification is relatively large, and/or the period is irregular, etc. For example, when the period time is not an integer, and cannot be evenly divided by the clock cycle. In other words, some embodiments of the present disclosure can be applied to both regular and irregular cycles.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
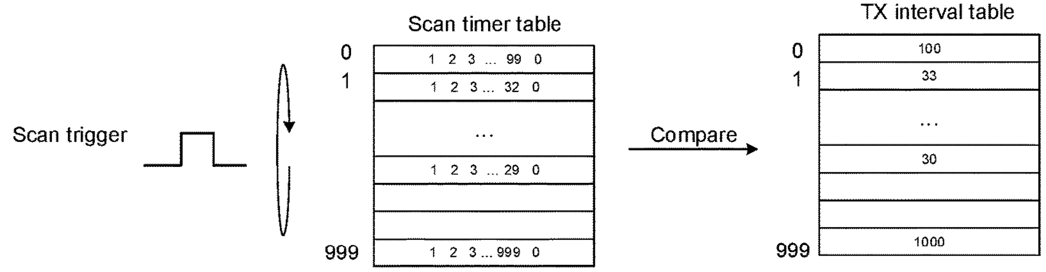
FIG. 1 is an exemplary diagram showing a solution for performing periodic task.
Figure 1:
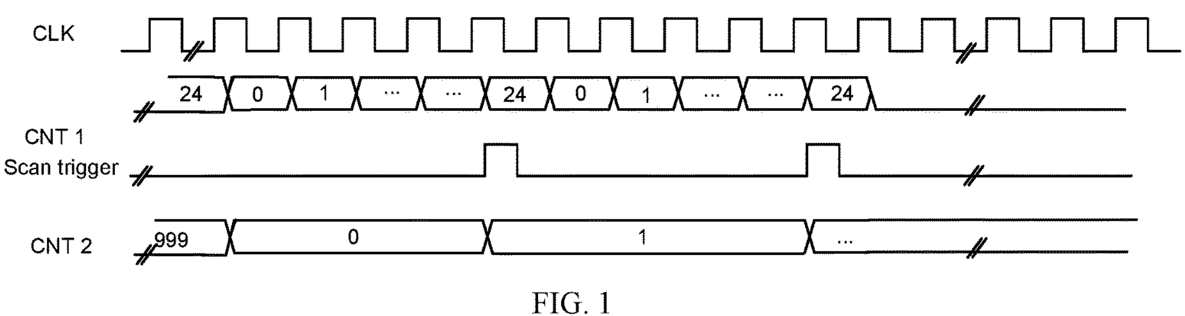

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term “network”, or “communication network/system” refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term “apparatus” herein may refer to any network node/entity/device in a communication network, or any end device that can access a communication network and receive services therefrom.

By way of example and not limitation, the apparatus for network node/entity/device may comprise a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

By way of example and not limitation, the apparatus for end device may comprise a terminal device, and further the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In electric systems, such as a telecommunication system, sending messages periodically is a common requirement, such as for connectivity check of BFD (Bidirectional Forwarding Detection), broadcast messages of VRRP (Virtual Router Redundancy Protocol), and/or similar TWAMP (Two Way Active Measurement Protocol).

There are several key variables in sending messages periodically. The specific interval, the scalability, the length. If the scalability is not too big and the interval is not too small, it can be realized by CPU (Central Processing Unit). However, if the interval is too small and the scalabilities are relatively large, CPU will not be a suitable choice.

Common intervals for sending messages in OAM (Operation Administration and Maintenance) area are 3 ms, 3.3 ms, 5 ms, 10 ms, 50 ms, 100 ms, 1 s, 10 s . . . . But it may also be an irregular value. For example, in throughput test scenario, stress testing should be done at different intervals and message lengths. Under certain bandwidth, when the length of the message is constantly changing, it means that the interval of the message is constantly changing.

FIG. 1 is an exemplary diagram showing a solution for performing periodic task.

As shown in FIG. 1, one solution is that, each session will maintain a transmission scan timer with threshold from the TX (transmit) interval table. FPGA will periodically scan the transmission timer table and add 1 to the inspected timer value under one scan trigger, then: if the results of the value are equal or larger than the threshold, a packet will be sent, and the corresponding timer value will be cleared before writing back; otherwise, the added value will be written back to the table and no packet will be initiated.

If the periodicities (i.e., intervals) for sending different messages are 3 ms, 3.3 ms, 5 ms, 10 ms. The least common divisor of these timing periods is 0.1 ms. The granularity of a timer for sending these messages is 0.1 ms.

Further, the maximum scalability needs to be determined in advance, because the size of the specification determines how much RAM resources are used. Supposing our scalability is 1000, then RAM with 1000 addresses storing the scan timer table may be scanned in 0.1 ms.

Since 0.1 ms/1000=100 ns, the operation of one session for one value/row of the timer table may be completed in 100 ns.

100 ns/CLK period=CNT1, which meaning how many CLK periods/cycles are allocated to finish the operation for one value/row of the timer table.

Supposing the CLK (clock) period is 4 ns (frequency: 250 Mhz), 100 ns/4 ns=25 (i.e., CNT1=25). The operation of one session may be completed every 25 clock cycles.

The operation of one session may be split into several steps: read operation, read result registration (in fact, unnecessary for better timing), comparison (if the data bit width is large, it may be necessary to split the comparison and then merge the results), accumulation and write back. 25 cycles are enough to complete these operations.

For example, the value of CNT 1 corresponds to the cycle numbers of the CLK (clock). Whenever the value of the CNT 1 is 24, one scan trigger signal (one pulse) is sent out, and the value of the CNT 1 is reset. CNT2 in FIG. 1 shows that the value in the last row (No. 999) of the timer table increases from 1 to 999. Then, the value increases to 1000, which is the threshold in the corresponding last row in the TX interval table. A task may be performed (e.g., a message may be sent), then the value in the last row is reset as 0.

If the scalability is not large (not too many different tasks/messages) and the interval is not too small, that solution has an advantage: with CNT1, time granularity is evenly divided by all sessions for all messages, the message transmission is smooth.

However, supposing that a bigger scalability is 2000, then the table with 2000 addresses must be scanned in 0.1 ms. 0.1 ms/2000=50 ns; 50 ns/CLK period=CNT1.

When the CLK period is still 4 ns (frequency: 250 Mhz), 50 ns/4 ns=12.5 (CNT1).

This is impractical since the CNT 1 should be integer.

Clock resources of processors, such as FPGA or ASIC are limited, and arbitrary frequency cannot be provided at will.

For another example, if the period of CLK is not 4 ns, i.e., frequency is not 250 Mhz, it may be 156.25 Mhz. This formula can't be divisible, either.

0.1 ms/1000=100 ns; 100 ns/CLK period=CNT1.

For example: the CLK period will be 6.4 ns, 100 ns/6.4 ns=15.625 (CNT1), not divisible either.

For the above two problems, although the scalability or frequency of the main clock will lead to non-divisibility, at least after the clock scheme is determined, the frequency of the main clock will not change.

For another throughput test scenario, the interval can be changed at any time. When the length of the message is constantly changing, it means that the interval of the message is constantly changing.

The formula will be: ? ns/?=? (CNT1), which is unable to achieve.

That is, the interval can change at any time, and can be irregular. Thus, it is highly possible for the CNT 1 to be impractical.

This method is sensitive to the frequency of the clock and the scalability, which will cause the timer to change. There is no universal applicability, and it is necessary to change the design when adapting to different products.

Further, if the scalability is much larger, the frequency of the main clock is not very high, and the granularity of the contract is very small, it can't be realized either.

For example: scalability may be 16 k sessions, clock is 125 Mhz (8 ns), time granularity 0.1 ms (100000 ns).

CNT1: 100000 ns/(16000*8 ns)<1; this is obviously impossible to achieve.

To achieve such a large scalability in practice, such 16 k sessions needs to be split into small scalabilities, copied and put together again. But this will take up more resources, and bring complexity.

Figure 2:
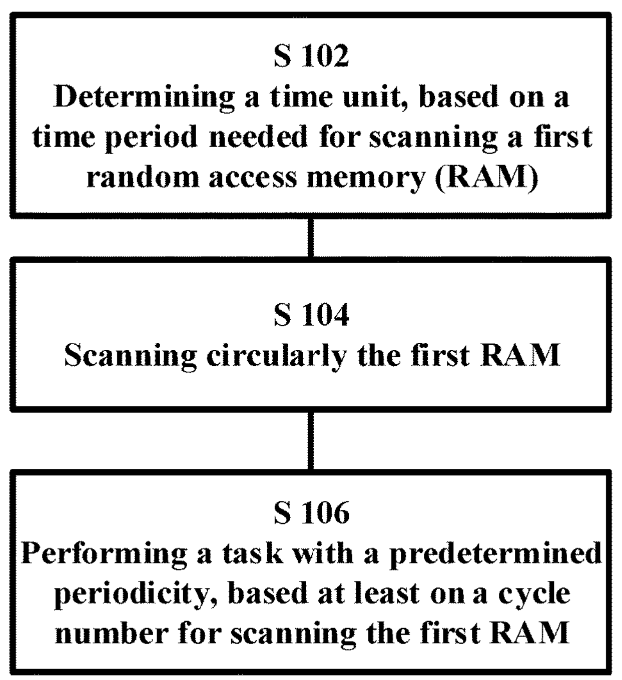
FIG. 2 is an exemplary flow chart showing a method for performing a periodic task, according to embodiments of the present disclosure.

FIG. 2 is an exemplary flow chart showing a method for performing a periodic task, according to embodiments of the present disclosure.

As shown in FIG. 2, the method 100 for performing a periodic task may comprise: a step S102, determining a time unit, based on a time period needed for scanning a first random access memory (RAM); a step S104, scanning circularly the first RAM; and a step S106, performing a task with a predetermined periodicity, based at least on a cycle number for scanning the first RAM. The cycle number is determined, based on the time unit and the predetermined periodicity.

According to embodiments of the present disclosure, the time unit is determined based on a time period needed for scanning a first random access memory (RAM), rather than to be determined based on a common divisor of several timing periods. A much smaller timing granularity may be achieved, and will be applicable even when the periodicities of periodic tasks have values varying in a large range, and/or when some periodicities have very small values.

In embodiments of the present disclosure, the time period is needed for scanning a first RAM one time.

In embodiments of the present disclosure, the cycle number equals to the predetermined periodicity divided by the time unit.

In embodiments of the present disclosure, the cycle number is stored in a second RAM.

Figure 3:
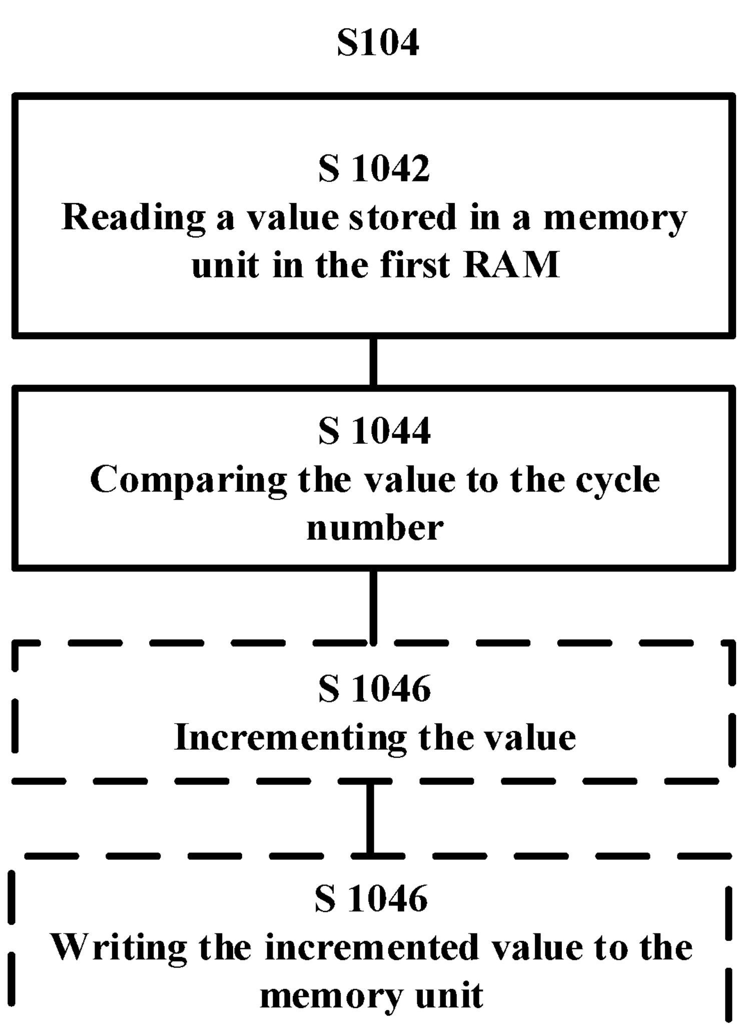
FIG. 3 is an exemplary flow chart showing substeps of the method shown in FIG. 2, according to embodiments of the present disclosure.

FIG. 3 is an exemplary flow chart showing substeps of the method shown in FIG. 2, according to embodiments of the present disclosure.

As shown in FIG. 3, in embodiments of the present disclosure, scanning the first RAM may comprise: a step S1042, reading a value stored in a memory unit in the first RAM; a step S1044, comparing the value to the cycle number; a step S1046, incrementing the value, and step S1048, writing the incremented value to the memory unit, if the value is less than the cycle number.

In embodiments of the present disclosure, the task is performed, if the value is greater than or equal to the cycle number.

According to embodiments, the task is performed or not, based on a value stored in a memory unit and a cycle number. No other counter, or trigger signal is needed, and thus a time granularity can be remained as small as possible.

In embodiments of the present disclosure, the first RAM comprises a plurality of memory units, with each memory unit being used for one task.

In embodiments of the present disclosure, the plurality of memory units are scanned sequentially or in parallel, during each cycle for scanning the first RAM.

According to embodiments of the present disclosure, the method is also applicable to a plurality of tasks, even with large scalability.

Figure 4:
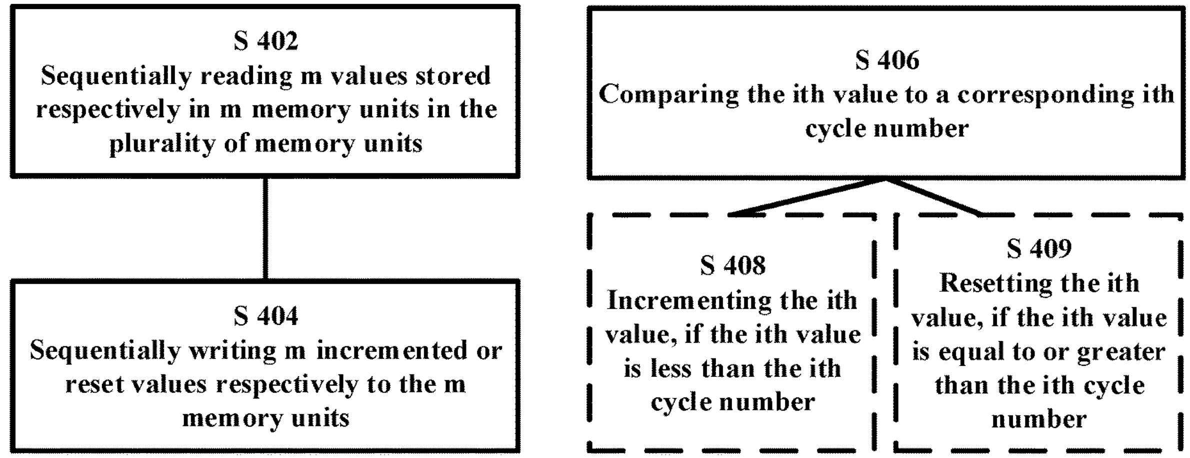
FIG. 4 is an exemplary flow chart showing other substeps of the method shown in FIG. 2, according to embodiments of the present disclosure.

FIG. 4 is an exemplary flow chart showing other substeps of the method shown in FIG. 2, according to embodiments of the present disclosure.

As shown in FIG. 4, in embodiments of the present disclosure, scanning the first RAM may comprise: a step S402, sequentially reading m values stored respectively in m memory units in the plurality of memory units; wherein m is an integer; a step S404, sequentially writing m incremented or reset values respectively to the m memory units. Following actions are performed in parallel with the sequentially reading action and/or the sequentially writing actions: for an ith value stored in an ith memory unit, wherein i is an integer equal to or greater than 1, and equal to or less than m, a step S406, comparing the ith value to a corresponding ith cycle number; a step S408, incrementing the ith value, if the ith value is less than the ith cycle number; or a step S409, resetting the ith value, if the ith value is equal to or greater than the ith cycle number.

In embodiments of the present disclosure, an ith task corresponding to the ith memory unit is performed, if the ith value is equal to or greater than the ith cycle number.

In embodiments of the present disclosure, a comparing step, an incrementing step, and/or a resetting step for the ith value are performed in parallel with a reading step, a comparing step, an incrementing step, a resetting step and/or a writing step for a jth value; wherein j is an integer equal to or greater than 1, equal to or less than m, and different from i.

According to embodiments, the reading operations and the writing operations can be performed sequentially and continuously, and other operations can be performed in parallel. The efficiency to utilize the RAM resource may be further improved.

In embodiments of the present disclosure, m+1 is a number of clock cycles needed to sequentially perform a reading step, a comparing step, an incrementing step or a resetting step, and a writing step for one value stored in one memory unit.

In embodiments of the present disclosure, the first RAM comprises a plurality of groups, each group including m memory units. The plurality of groups are scanned sequentially.

In embodiments of the present disclosure, the time unit equals to 2*k*clock cycle period, when k is greater than or equal to 2*m; wherein k is a total number of memory units in the first RAM. The symbol *means multiplying.

According to embodiments of the present disclosure, even when the scalability (i.e., k) is great, a small time granularity (i.e., 2*k*clock cycle period) may be still achieved.

In embodiments of the present disclosure, the first RAM is associated with a field programmable gate array, FPGA, or an application specific integrated circuit, ASIC.

In embodiments of the present disclosure, the task comprises transmitting data packets periodically; or the task comprises transmitting a report periodically: or the task comprises detecting a timeout of a report periodically.

According to embodiment of the present disclosure, the method is generally applicable in many scenarios.

According to embodiments of the present disclosure, the realization of flexible time interval for sending messages periodically in FPGA, ASIC may be achieved. FPGA, ASIC is a suitable choice, even when the interval is too small and the scalabilities are relatively large.

According to embodiments of the present disclosure, operations for scanning occur every cock cycle. High-frequency scanning is used instead of starting a timer. The minimum time granularity is realized.

Compared to a traditional way that starts a timer to trigger scanning but leaving the rest of the time being idle, the method according to embodiments herein provides the granularity, which will be much smaller than that of traditional methods, since the scan timer trigger is removed.

In this way, large scalabilities can be realized even if the granularity is small. This method doesn't need to, split large scalabilities into small scalabilities and then merge them.

This method is not only suitable for slow and small-scale scenes, but also suitable for fast and large-scale scenes. Particularly, when it is embodied as an IP (Intellectual property) module, it should be compatible for the change of clock frequency. When the main clock and the granularity changes, the only thing that needs to change is to recalculate the value of the interval table. The IP module itself (i.e., the steps of the method) needs not to be redesigned.

Especially in the throughput test scenario, when the length of the message is constantly changing, only the interval table needs to be reconfigured. In this way, it can be adapted to each product without modifying the design. Such method can reduce the design and develop cost.

Further detailed embodiments will be illustrated.

Figure 5A:
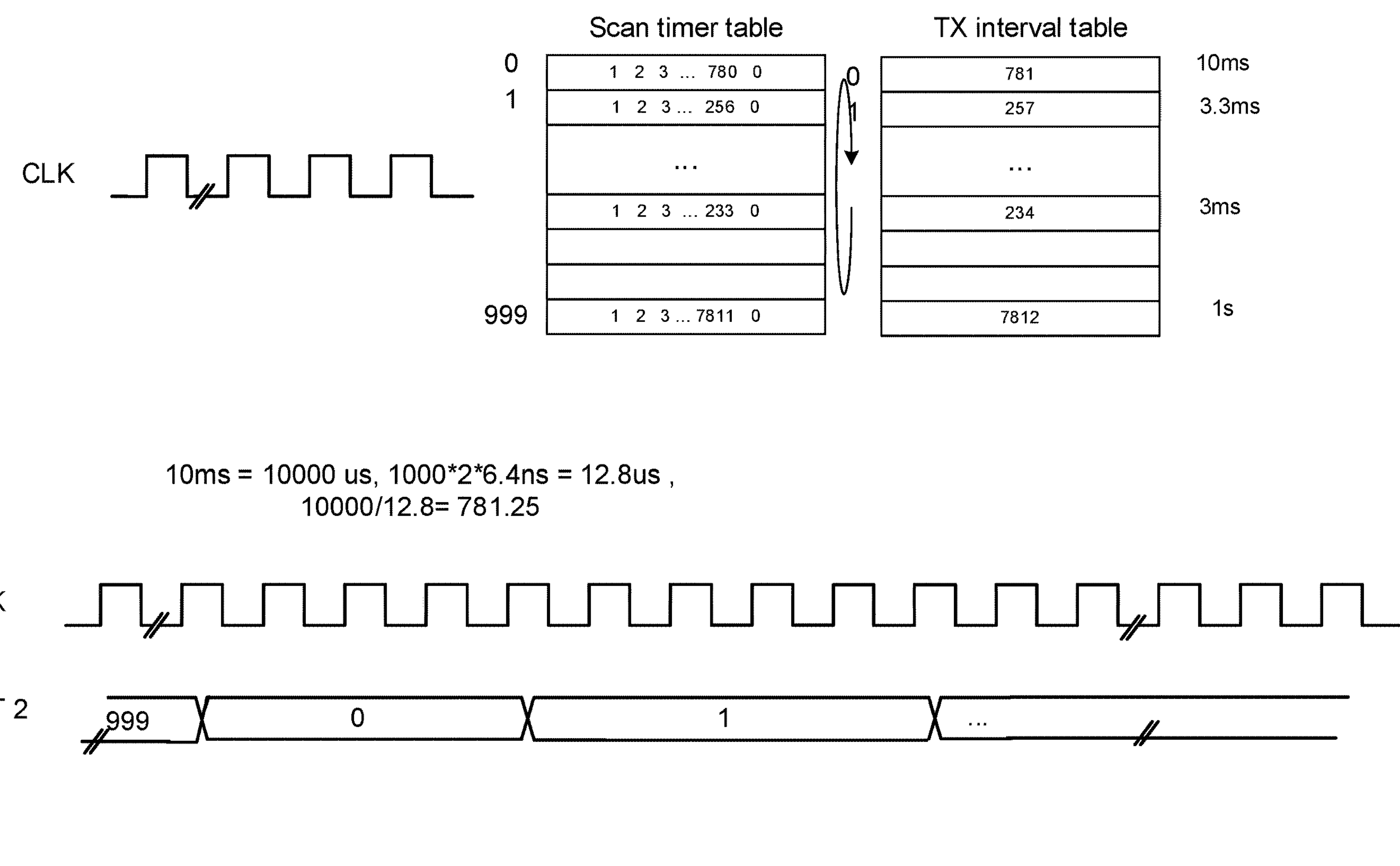
FIG. 5A is an exemplary diagram showing an improved solution for performing periodic task, according to embodiments of the present disclosure.

FIG. 5A is an exemplary diagram showing an improved solution for performing periodic task, according to embodiments of the present disclosure.

As shown in FIG. 5A, essentially, the scan timer trigger shown in FIG. 1 is removed, and CNT1 is not used. That is, a timer is not used to trigger reading and writing of the scan timer table, reading and writing are performed sequentially every clock cycle.

Further, after the pipeline technic (i.e., parallel operations) is applied, it is equal to that scanning operations for one address are completed in two clock cycles.

Assuming the scalability is 1000, the granularity is 1000*2*clock cycle. If the master clock is 156.25 Mhz and the period is 6.4 ns, then the granularity is 6.4 ns*2000=12800 ns=12.8 μs.

Assuming the scalability is 100, the granularity is 100*2*clock cycle. If the master clock is 156.25 Mhz and the period is 6.4 ns, then the granularity is 6.4 ns*200=1280 ns=1.28 μs. The granularity is u s level.

Further, according to embodiments of the present disclosure, the size of the first RAM may be related to the specific requirement to be implemented. For example, if 2000 sessions should be implemented, while the on-chip RAM is 1000 deep, then two ram may be used to spilt it in depth.

If the specific requirement is 500 and the ready-made ram is 1000, the range of scanning RAM may be controlled to return at 499th memory unit/address.

The time granularity of traditional methods is in ms level, even in s level. The advantage might be that the transmission is smooth, since the time granularity is rather big.

The time granularity of the method provided by embodiments of the present disclosure is in us level. In this way, large-scale applications can be realized without considering the influence of clock frequency change. The only limitation might be that an impact may occur because a too small granularity might cause traffic bursts. However, it will be easily overcome by configuring some lower limit for the value of time granularity.

Some details about the pipeline, which is applied to improve reading and writing efficiency and reduce time granularity, will be further illustrated.

Figure 5B:
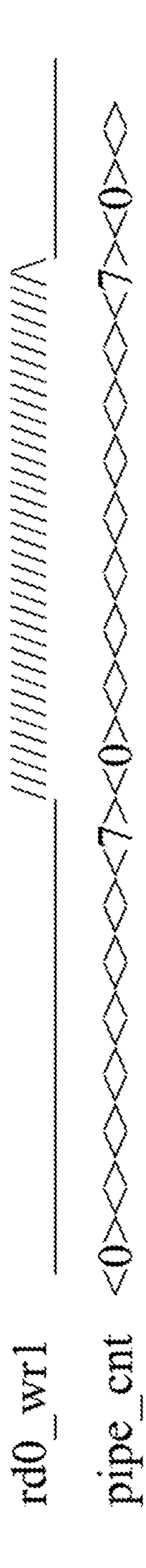
FIG. 5B is an exemplary diagram showing operations for pipeline.

FIG. 5B is an exemplary diagram showing operations for pipeline.

Pipe_cnt is used to count the cycle of read-and-write-back process. The value of Pipe_cnt may be changed per each clock cycle. As shown in FIG. 5B, during a first period of "<0> < > < > < > < > < > <7>" (eight continuous clock cycles), a signal "rd0_wr1" may be at a level of 0, which means a reading period. Then, during next period of "<0> < > < > < > < > < > < > <7>" (eight continuous clock cycles), the signal "rd0_wr1" may be changed to a level of 1, which means a writing period.

Transmission timer scanning processes may be illustrated as follows.

The scan is separated into two phases: read phase and write phase, and each phase will take 8 clock cycles, which is indicated by the phase counter value 0 to 7, pipe_cnt.

In read phase 1st cycle, timer value (stored in the scan timer table of the first RAM) of session n is read;

In read phase 2nd cycle, timer value of session n is latched; timer interval/threshold (stored in the TX interval table of the second RAM) of session n is read;

In read phase 3rd cycle, one cycle of timer is delayed; timer threshold of session n is latched;

In read phase 4th cycle, one cycle of timer & threshold is delayed; the timer value is compared to the threshold (1st stage);

In read phase 5th cycle, the timer value is compared to the threshold (2nd stage);

In read phase 6th cycle, the timer value is compared to the threshold (3rd stage);

In read phase 7th cycle, the write back data is determined (either incremented or reset);

In read phase 8th cycle, one cycle is delayed;

In write phase 1-8 cycle, write back timer value to session n, session n+1, . . . session n+7.

These processes will be pipelined so that, it is equal to that each session (for one memory unit with a specific address) will be scanned in 2 clock cycles.

Figure 5C:
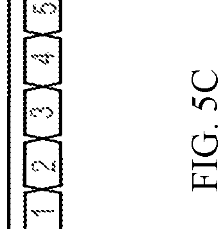
FIG. 5C is an exemplary diagram showing specific operations for the RAM addresses.

FIG. 5C is an exemplary diagram showing specific operations for the RAM addresses.

For example, as shown in FIG. 5C, in first 8 cycles, the RAM address 0-7 are read. Then, in the next 8 cycles the RAM address 0-7 are written. In third 8 cycles, the RAM address 8-15 are read. Then, in the next 8 cycles the RAM address 8-15 are written.

Figure 6:
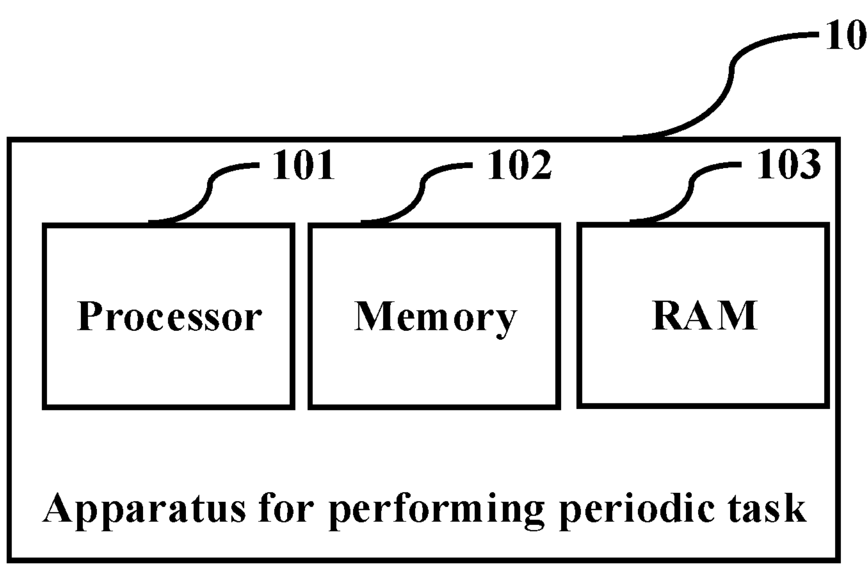
FIG. 6 is a block diagram showing an apparatus for performing periodic task, in accordance with embodiments of the present disclosure.

FIG. 6 is a block diagram showing an apparatus for performing periodic task, in accordance with embodiments of the present disclosure.

As shown in FIG. 6, an apparatus 10 for performing a periodic task may comprise: a processor 101; and a memory 102. The processor is configured for: determining a time unit, based on a time period needed for scanning a first random access memory, RAM 103; scanning circularly the first RAM; and performing a task with a predetermined periodicity, based at least on a cycle number for scanning the first RAM. The cycle number is determined, based on the time unit and the predetermined periodicity.

The memory 102 may be used for storing programs executable by the processor 101. The first RAM may be or may not be a part of the memory 102.

In embodiments of the present disclosure, the apparatus 10 may be further operative to implement the method above mentioned, such as shown in FIG. 2, 3, 4, 5A, 5B.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 7:
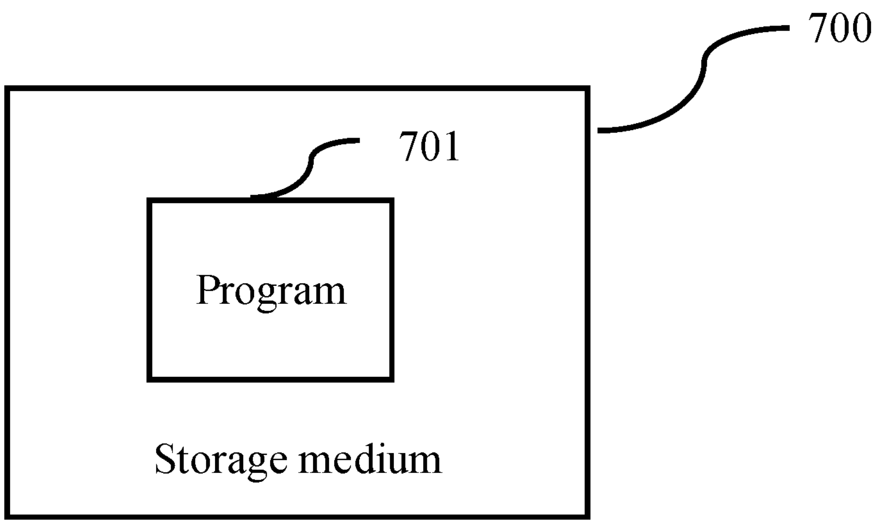
FIG. 7 is a block diagram showing a computer readable storage medium in accordance with embodiments of the present disclosure.

FIG. 7 is a block diagram showing a computer readable storage medium in accordance with embodiments of the present disclosure.

As shown in FIG. 7, a computer readable storage medium 700 having a computer program 701 stored thereon, the computer program 701 may be executable by an apparatus to cause the apparatus to carry out the method above mentioned, such as shown in FIG. 2, 3, 4, 5A, 5B.

The computer readable storage medium 700 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

According to embodiments of the present disclosure, an improvement for performing a periodic task may be provided. Particularly, embodiments of the present disclosure may be applied not only in slow and small-scale periodicities, but also applicable even when the periodicities have values varying in a large range, and/or when some periodicities have very small values.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Abbreviation Explanation

FPGA Field-Programmable Gate Array

The invention claimed is:

1. A method for performing a periodic task, comprising:
determining a time unit, based on a time period needed for scanning a first random access memory, RAM;
scanning circularly the first RAM; and
performing a task with a predetermined periodicity, based at least on a cycle number for scanning the first RAM, wherein the task performed with the predetermined periodicity is other than scanning the first RAM;
wherein the cycle number equals to the predetermined periodicity divided by the time unit, such that the first RAM is scanned a number of times equal to the cycle number to indicate a timing for performing the task.

2. The method according to claim 1, wherein the time period is needed for scanning a first RAM one time.

3. The method according to claim 1, wherein the cycle number is stored in a second RAM.

4. The method according to claim 1, wherein scanning the first RAM comprises:

reading a value stored in a memory unit in the first RAM;

comparing the value to the cycle number; and incrementing the value, and writing the incremented value to the memory unit, if the value is less than the cycle number.

5. The method according to claim 4, wherein the task is performed, if the value is greater than or equal to the cycle number.

6. The method according to claim 1, wherein the first RAM comprises a plurality of memory units, with each memory unit being used for one task.

7. The method according to claim 6, wherein the plurality of memory units are scanned sequentially or in parallel, during each cycle for scanning the first RAM.

8. The method according to claim 6, wherein scanning the first RAM comprises:

sequentially reading m values stored respectively in m memory units in the plurality of memory units; wherein m is an integer;

sequentially writing m incremented or reset values respectively to the m memory units;

wherein following actions are performed in parallel with the sequentially reading action and/or the sequentially writing actions;

for an ith value stored in an ith memory unit, wherein i is an integer equal to or greater than 1, and equal to or less than m, comparing the ith value to a corresponding ith cycle number; and incrementing the ith value, if the ith value is less than the ith cycle number; or resetting the ith value, if the ith value is equal to or greater than the ith cycle number.

9. The method according to claim 8, wherein an ith task corresponding to the ith memory unit is performed, if the ith value is equal to or greater than the ith cycle number.

10. The method according to claim 8, wherein a comparing step, an incrementing step, and/or a resetting step for the ith value are performed in parallel with a reading step, a comparing step, an incrementing step, a resetting step and/or a writing step for a jth value; and wherein j is an integer equal to or greater than 1, equal to or less than m, and different from i.

11. The method according to claim 8, wherein m+1 is a number of clock cycles needed to sequentially perform a reading step, a comparing step, an incrementing step or a resetting step, and a writing step for one value stored in one memory unit.

12. The method according to claim 8, wherein the first RAM comprises a plurality of groups, each group including m memory units; and wherein the plurality of groups are scanned sequentially.

13. The method according to claim 9, wherein the time unit equals to 2*k*clock cycle period, when k is greater than or equal to 2*m; and wherein k is a total number of memory units in the first RAM.

14. The method according to claim 1, wherein the first RAM is associated with a field programmable gate array, FPGA, or an application specific integrated circuit, ASIC.

15. The method according to claim 1, wherein the task comprises transmitting data packets periodically; or wherein the task comprises transmitting a report periodically: or wherein the task comprises detecting a timeout of a report periodically.

16. An apparatus for performing a periodic task, comprising:

a processor; and a memory;

wherein the processor is configured for:

determining a time unit, based on a time period needed for scanning a first random access memory, RAM;

scanning circularly the first RAM; and performing a task with a predetermined periodicity, based at least on a cycle number for scanning the first RAM, wherein the task performed with the predetermined periodicity is other than scanning the first RAM;

wherein the cycle number equals to the predetermined periodicity divided by the time unit, such that the first RAM is scanned a number of times equal to the cycle number to indicate a timing for performing the task.

17. The apparatus according to claim 16, wherein the time period is needed for scanning a first RAM one time.

18. A non-transitory computer readable storage medium having a computer program stored thereon, the computer program executable by an apparatus to cause the apparatus to:

determine a time unit, based on a time period needed for scanning a first random access memory, RAM;

scan circularly the first RAM; and perform a task with a predetermined periodicity, based at least on a cycle number for scanning the first RAM, wherein the task performed with the predetermined periodicity is other than scanning the first RAM;

wherein the cycle number equals to the predetermined periodicity divided by the time unit, such that the first RAM is scanned a number of times equal to the cycle number to indicate a timing for performing the task.

* * * * *